(12) United States Patent
Howe et al.

(10) Patent No.: US 11,289,807 B2
(45) Date of Patent: Mar. 29, 2022

(54) THREE-DIMENSIONAL PHASED ARRAY ANTENNA

(71) Applicant: The Boeing Company, Chicago, IL (US)

(72) Inventors: Wayne R. Howe, Chicago, IL (US); Julio A. Navarro, Chicago, IL (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 16/828,435

(22) Filed: Mar. 24, 2020

(65) Prior Publication Data
US 2021/0305693 A1    Sep. 30, 2021

(51) Int. Cl.
| | |
|---|---|
| *H01Q 21/08* | (2006.01) |
| *H01Q 3/26* | (2006.01) |
| *G01S 13/02* | (2006.01) |
| *H01Q 21/06* | (2006.01) |
| *G01S 13/90* | (2006.01) |
| *H01Q 3/28* | (2006.01) |
| *G01S 13/04* | (2006.01) |
| *H01Q 3/34* | (2006.01) |

(52) U.S. Cl.
CPC ........... *H01Q 3/2694* (2013.01); *G01S 13/02* (2013.01); *H01Q 21/062* (2013.01); *G01S 13/04* (2013.01); *G01S 13/90* (2013.01); *G01S 2013/0245* (2013.01); *H01Q 3/28* (2013.01); *H01Q 3/34* (2013.01)

(58) Field of Classification Search
CPC ...... H01Q 3/2694; H01Q 21/062; H01Q 3/28; H01Q 3/34; G01S 13/02; G01S 13/04; G01S 13/90
See application file for complete search history.

(56) References Cited

U.S. PATENT DOCUMENTS

| | | |
|---|---|---|
| 3,755,815 A | 8/1973 | Stangel |
| 2020/0166623 A1* | 5/2020 | Sahin ...................... G01S 13/04 |

OTHER PUBLICATIONS

Sipus Z., Burum N., and Bartolic J. (2003a), "Analysis of Rectangular Microstrip Patch Antennas on Spherical Structures", Microwave and Optical Technology Letters, vol. 36, pp. 276-280, Feb. 2003.

Roke Manor Research Ltd., Roke Manor, Romsey, Hampshire, UK.
(Continued)

*Primary Examiner* — Joseph J Lauture
(74) *Attorney, Agent, or Firm* — McDonnell Boehnen Hulbert & Berghoff LLP

(57) ABSTRACT

Example embodiments relate to 3D phased array-antenna systems and devices. A system may include a 3D structure with its center located at an origin of a reference coordinate system that includes an X-axis, a Y-axis, and a Z-axis extending from the origin of the reference coordinate system. The system may also include antenna arrays that have antenna elements configured to operate via electronic steering. The antenna arrays can be coupled to the 3D structure such that electronically steering antenna elements of the antenna arrays enables the antenna elements to transmit and receive electromagnetic signals simultaneously in numerous directions relative to the X-axis, the Y-axis, and the Z-axis of the reference coordinate system. The system may be used in various applications, including data transmission and reception, radar, and broadband signaling.

20 Claims, 15 Drawing Sheets

(56) References Cited

OTHER PUBLICATIONS

"Geodesic Dome Phased-Array Antenna Demonstrates TT&C Capacity"; Wright-Patterson AFB Nov. 18, 2009. http://www.wpafb.af.mil/news/story.asp?id=123178153 and https://www.ball.com/aerospace/Aerospace/media/Aerospace/Downloads/D1692_GDPAA_1.pdftext=.pdf.

M.P. DeLisio and R.A. York, "Quasi-optical and Spatial Power Combining", IEEE Transactions on Microwave Theory and Techniques, vol. 50, No. 3, pp. 929-936, Mar. 2002.

Tomasic, et al., "Spherical Arrays—Design Considerations", IEEE Press, 2005.

Josefsson et al., "The dome array concept using a single planar array and a passive lens for hemispherical coverage; Conformal Array Antenna Theory and Design", IEEE Press, 2006.

\* cited by examiner

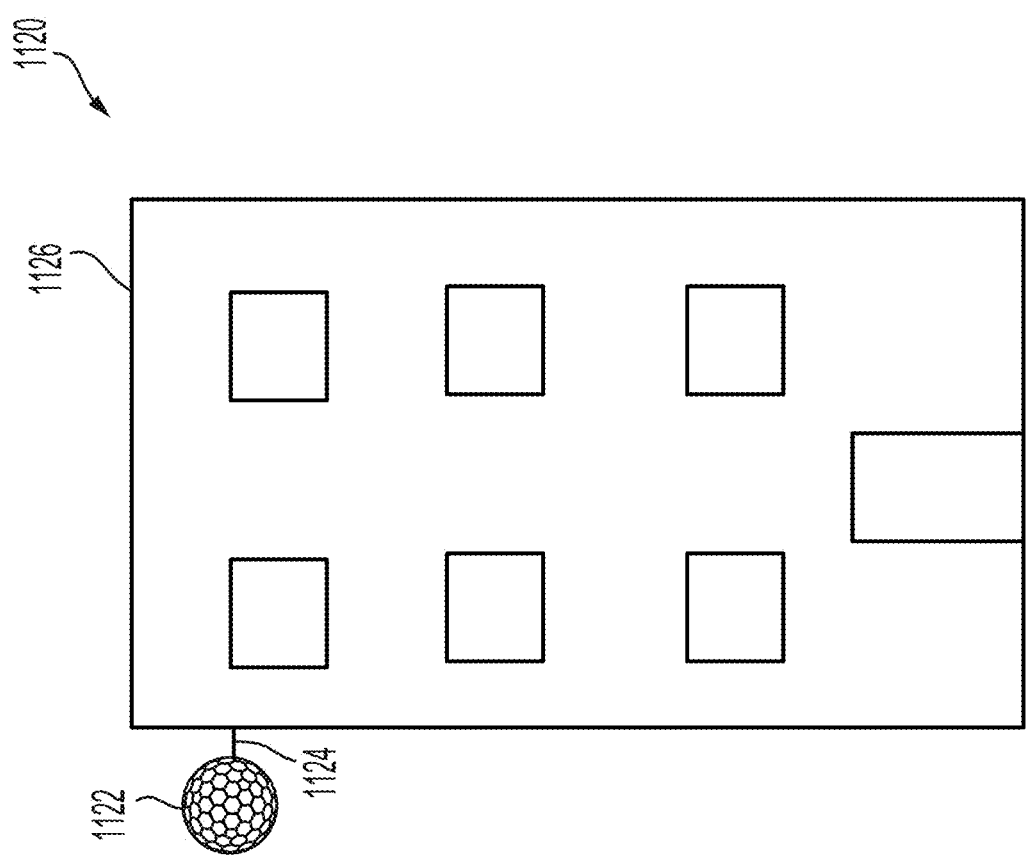

THREE-DIMENSIONAL PHASED ARRAY ANTENNA

FIELD

The present disclosure relates generally to an antenna system, and more particularly to a three-dimensional (3D) phased array antenna.

BACKGROUND

An antenna can function as the interface between radio waves propagating through space and electric currents moving in metal conductors. During transmission, a radio transmitter supplies an electric current to the terminals of the antenna causing the antenna to radiate into space the energy from the electric current in the form of electromagnetic waves, also referred to herein as radio waves or signals. During reception, the antenna intercepts a portion of a radio wave traversing space and subsequently produces an electric current at the antenna's terminals using the energy from the radio wave. This electric current can then be applied to a receiver to be amplified.

An antenna can include an array of conductors (elements) that are electrically connected to the receiver or transmitter. In addition, an antenna can be configured to transmit and receive radio waves in all horizontal directions equally as an omnidirectional antenna or configured to transmit and receive in a particular direction as a high-gain or "beam" antenna. The antenna can also include components not connected to the transmitter, such as parabolic reflectors, horns, or parasitic elements, which can serve to direct the radio waves into a beam or other desired radiation pattern.

SUMMARY

In one example, a system is described. The system includes a three-dimensional (3D) structure. A center of the 3D structure is located at an origin of a reference coordinate system and the reference coordinate system includes an X-axis, a Y-axis, and a Z-axis extending from the origin of the reference coordinate system. The system also includes a plurality of antenna elements. Each antenna element of the plurality of antenna elements is configured to operate via electronic steering as an antenna array of a plurality of antenna arrays. The plurality of antenna elements is coupled to the 3D structure such that electronically steering antenna elements from the plurality of antenna elements enables antenna arrays from the plurality of antenna arrays to electronically steer electromagnetic signals simultaneously in a plurality of directions relative to the X-axis, the Y-axis, and the Z-axis of the reference coordinate system.

In another example, a device is described. The device includes a three-dimensional (3D) structure. A center of the 3D structure is located at an origin of a reference coordinate system. The reference coordinate system includes an X-axis, a Y-axis, and a Z-axis extending from the origin of the reference coordinate system. The device also includes a plurality of antenna arrays. Each antenna array includes antenna elements configured to operate via electronic steering and the plurality of antenna arrays is coupled to the 3D structure such that electronically steering antenna elements of one or more antenna arrays enables simultaneous operation in a plurality of directions relative to the X-axis, the Y-axis, and the Z-axis of the reference coordinate system. The device also includes a processor configured to: electronically steer a first set of antenna elements to transmit a first signal in a first direction of the plurality of directions; and electronically steer a second set of antenna elements to transmit a second signal in a second direction of the plurality of directions, wherein the first direction and the second direction are different.

In a further example, a method is described. The method involves causing, by a processor, a first plurality of antenna elements from a plurality of antenna arrays to radiate a signal in a particular direction from a plurality of directions. The plurality of antenna arrays is coupled to a three-dimensional (3D) structure. A center of the 3D structure is located at an origin of a reference coordinate system that includes an X-axis, a Y-axis, and a Z-axis extending from the origin of the reference coordinate system. The plurality of antenna arrays is coupled to the 3D structure such that antenna elements of the plurality of antenna arrays are configured to operate in the plurality of directions relative to the X-axis, the Y-axis, and the Z-axis of the reference coordinate system. The method also involves causing, by the processor, a second plurality of antenna elements from the plurality of antenna arrays to receive a second signal from the particular direction.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 11C illustrates a building system, according to one or more embodiments.

DETAILED DESCRIPTION

Figure 1:
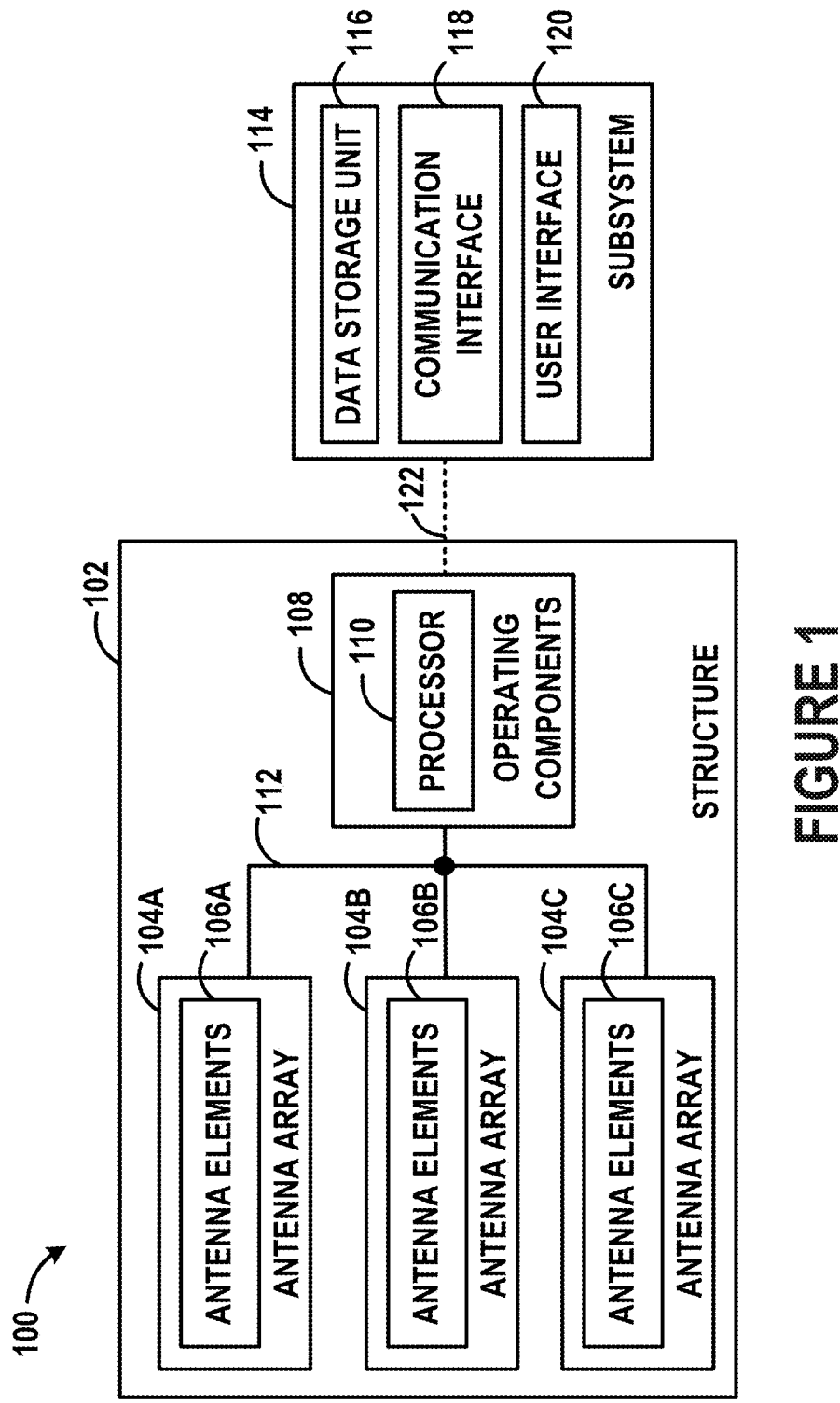
FIG. 1 is a block diagram for a system, according to one or more example embodiments.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Conventional phased array antennas generally operate in two dimensions (2D). For instance, a conventional antenna system is often able to operate in a full 360 degree rotation horizontally, but might only be able to operate with approximately 60 degrees of vertical elevation coverage relative to the horizontal plane. Due to these operational constraints, a conventional system might not be able to operate at any elevation that exceeds the 60-degree vertical elevation limitation.

Example embodiments relate to 3D phased array antenna systems and devices capable of operation in all directions. For example, a 3D phased array antenna system can be configured to transmit signals in all directions extending away from the system, including across a range of elevations that extend up to 90 degrees above and below a horizontal plane. In particular, the system may use electronic steering to direct beams from antenna elements positioned at various locations of the system in one or more particular directions. The system can also be configured to receive signals from all directions relative to the system. Thus, without the operational constraints associated with conventional 2D systems, example 3D systems and devices presented herein can be used in a variety of applications, including transceiving (transmitting and receiving) signals in multiple directions simultaneously.

To further illustrate, an example system may involve a number of antenna elements coupled to or disposed on the exterior of a 3D structure with each antenna element configured to transmit and/or receive (i.e., transceive) signals. With the 3D structure serving as a physical base for the system, the antenna elements may be positioned in a configuration that enables transmission (or reception) of signals in all directions, including 360 degrees around the 3D structure and across all elevations (i.e., upward away from and downward toward the ground). Two or more antenna elements may form an antenna array for transmitting and/or receiving (transceiving) a directional beam. The antenna elements forming an antenna array may be pointed in the same direction or the antenna elements may be pointed in different directions and still be part of the same array to transmit or receive a beam or directional wave. The system can cause antenna elements of one or more antenna arrays to transmit and/or receive one or more signals in one or more directions simultaneously. For example, one or more sets of antenna elements can be electronically steered by the system to direct, transmit, or receive signals (e.g., beams, planar waves, or wavefronts) in one or more desired directions simultaneously. In addition, antenna elements of other antenna arrays can also be used to increase gain and reinforce signals transmitted and/or received by the system.

The directional operation of the 3D system may be described with respect to a reference coordinate system. For example, the reference coordinate system may serve as an imaginary guide that includes an X-axis, a Y-axis, and a Z-axis extending from an origin. With the 3D structure located at the origin of the reference coordinate system, transmission and reception of signals by the 3D system can then be described relative to the X-axis, the Y-axis, and the Z-axis of the reference coordinate system. In particular, the antenna arrays may transmit and/or receive signals in all directions relative to the reference coordinate system, including along the X-axis, the Y-axis, the Z-axis, and combinations thereof. For example, the antenna arrays may be coupled to the 3D structure such that electronically steering a combination of antenna elements from one or more antenna arrays enables the combination of antenna elements to radiate signals simultaneously in multiple directions relative to the X-axis, the Y-axis, and the Z-axis of the reference coordinate system. In some instances, the antenna arrays may also be mechanically steered to modify the direction of operation of antenna elements.

In some embodiments, transmission of signals may involve using one or more combinations of antenna elements of antenna arrays to further enhance the transmission. For instance, the positions of antenna elements within the system can be used to reinforce or cancel signals for directionality. In some instances, the system may use one or more antenna arrays to transmit and/or receive low frequency (e.g., di-pole) communications. The system may also use one or more antenna arrays to transmit and/or receive high frequency communications, such as electromagnetic waves in the microwave or millimeter or shorter wavelengths. The system may transmit and/or receive radio waves as beams in any 3D direction with equal or unequal amplitude to form a time-shifted or phase-shifted signal in any direction.

In some examples, systems and devices may use beamforming or spatial filtering for directional signal transmission and/or reception. For instance, a system may combine antenna elements in such a way that signals at particular angles experience constructive interference while others experience destructive interference. Beamforming can be used at both the transmitting and receiving ends in order to achieve spatial selectivity. For example, beamforming can be used for radio or sound waves.

In some examples, systems and devices may use beam steering to change the direction of the main lobe of a radiation pattern. For instance, a system may perform beam steering via switching antenna elements or by changing the relative phases of the RF signals driving the antenna elements. In some systems, beam steering can be used to direct sound waves from speakers to a particular direction. As such, systems and devices may perform beamforming, beam steering, or a combination in some examples.

In addition, example systems and devices may be used for various applications. In one embodiment, a 3D system or device may be used for data transmission via radio waves. For example, a 3D device may use antenna arrays to transmit radio waves carrying data to one or more other devices, such as wireless technology for digital cellular networks (e.g., 5G). Similarly, the 3D device may also use antenna arrays to receive radio waves carrying data. In another embodiment, a 3D system or device may be used to measure a surrounding environment. For example, the 3D system or device may serve as a radar system for a vehicle, an aircraft, a station, or another type of entity. In some embodiments, a system may be used with a 3D audio speaker arrangement that includes audio speakers and/or microphones for one or more antenna elements, 3D Sonar (e.g., acoustic waves in water with a sonar transducer substituting for an antenna element), 3D Ultrasonic with an ultrasonic transducer substituting for an antenna element, and 3D optical phased arrays with optical transducers substituting for antenna elements. In a further embodiment, a system may be used in 5G, 6G or other more advanced communications for both broadband and narrowband.

Example systems and devices may also include additional components to enable the transmission and reception of signals using one or more of the antenna arrays. The additional components may include, but are not limited to, a waveform generator, other forms of transducers, a transmitter, a receiver, an analog-to-digital converter, a digital-to-analog converter, a signal processor, a computing system, or a display interface. The quantities and arrangement of additional components may differ within example systems.

Referring now to the Figures, FIG. 1 is a block diagram for a system, according to an example implementation. The system 100 represents an example 3D phased array antenna system capable of performing operations described herein. As shown in FIG. 1, the system 100 includes a structure 102, antenna arrays 104A, 104B, 104C, and operating components 108 connected via connection link 112. In addition, the system 100 also shows the operating components 108 connected to a subsystem 114 via connection link 122. The block diagram shown in FIG. 1 represents one possible implementation of the system 100. In other embodiments, the system 100 may include more or fewer components in other arrangements.

The system 100 may be used within various applications. In one embodiment, the system 100 is configured to use antenna arrays 104A-104C to transmit and receive radio signals. For example, the system 100 may emit radio signals to remotely positioned devices (e.g., computing systems, smartphones, Wi-Fi, home and office broadband and narrowband transceiver systems, and other antennas). In another embodiment, the system 100 is configured to operate as a radar system configured to transmit and receive radar measuring aspects of the environment. Further, the system 100 may also send and measure sound waves (e.g., sonar). Other potential uses of the system 100 are possible.

The placement and mobility of the system 100 can vary within examples. In some examples, the system 100 is configured to operate as a stationary system. For instance, the structure 102 of the system 100 may have a fixed position that limits or prevents movement of the system 100 overall. In one example, the system is configured to operate in a neighborhood location to transmit and receive to and from homes, or on a block of high rise buildings to transmit and receive to and from apartments and offices. In other examples, the system 100 can operate as a mobile system. For example, the structure 102 can be (or is coupled to) a vehicle, an aircraft, a satellite, or another type of mobile platform that enables the antenna arrays 104A-104C to operate at different positions and orientations. In one embodiment, the structure 102 may include a platform configured to adjust overall orientation of the system 100 via one or more motions (e.g., rotatable or using a gimbal). In some examples, the structure 102 may be configured to connect (and disconnect) to a vehicle, aircraft, or other types of mobile devices, which can enable the system 100 to be used in multiple applications.

The structure 102 may generally serve as a physical structure for the system 100 and can enable the antenna arrays 104A-104C to be positioned in a configuration that enables operation of antenna elements in various directions extending from the structure 102. To add context with respect to the direction of operation of the antenna arrays 104A-104C, some examples described herein involve assigning directions based on the alignment of a reference coordinate system with the structure 102. In particular, a center (or another portion) of the structure 102 can be located at the origin of the reference coordinate system enabling transmission (and reception) of signals by the antenna arrays 104A-104C to be described with respect to axes of the reference coordinate system.

In some examples, the reference coordinate system used to describe operations of the system 100 is a Cartesian coordinate system configured for a 3D space. Particularly, the reference coordinate system may include an ordered triplet of lines (i.e., the axes) that go through a common point referred to as the origin of the reference coordinate system. The three coordinate axes (e.g., an X-axis, a Y-axis, and a Z-axis) are given with each perpendicular to the other two at the origin (i.e., the point at which the axes cross). Relative to these axes, the position of any point in 3D space can then be given by an ordered triple of real numbers, each number giving the distance of that point from the origin measured along the given axis which is equal to the distance of that point from the plane determined by the other two axes. In a similar way, the direction of operation of the antenna arrays 104A-104C may be represented based on the reference coordinate system. For example, the system 100 may transmit (or receive) signals using one or more antenna arrays in various directions relative to the X-axis, the Y-axis, and the Z-axis.

In other embodiments, the reference coordinate system used to represent direction of operation of the antenna arrays 104A-104C relative to the structure 102 may be a different type of coordinate system. For instance, a spherical coordinate system may be used as the reference coordinate system in some embodiments. A spherical coordinate system can be used for 3D space by specifying the position of a point using three measurements. The measurements include the radial distance of that point from a fixed origin, its polar angle measured from a fixed zenith direction, and the azimuthal angle of its orthogonal projection on a reference plane that passes through the origin and is orthogonal to the zenith, measured from a fixed reference direction on that plane. In some instances, the radial distance may also be referred to as the radius or radial coordinate and the polar angle may also be referred to as colatitude, zenith angle, normal angle, or inclination angle. Similar to the 3D Cartesian coordinate system, the spherical coordinate system can be used to describe the directions of operation of the antenna arrays 104A-104C.

Parameters of the structure 102, such as the structure's shape, materials, size, etc., may vary within examples. For instance, some example 3D shapes that may be used for the structure 102 include, but are not limited to, cubes, cuboids, cylinders, hexagonal prisms, triangular prisms, spheres, geodesic domes, hemispheres, pyramids, and dodecahedrons. The structure 102 can also be a combination of shapes or a preexisting structure. For example, antenna arrays may be strategically positioned directly on the exterior surface of a vehicle, an aircraft, a building, a street sign, a traffic light, a light post, or another surface. In addition, the structure 102 may be generated in various types of materials. For instance, the 3D structure may be made out of aluminum, copper, iron, steel, titanium, or another type of metal or metal alloy. Other non-metal types of materials may also be used, such as wood or plastic. In addition, a combination of materials may be used for the structure 102.

In some embodiments, one or more parameters used for the structure 102 may depend on the desired use of the system or device. For example, a lighter material may be selected when the 3D structure is positioned on a vehicle or aircraft and a heavier, more durable material may be selected when the 3D structure is stationary. Construction and material costs, as well as expected weather conditions for typical use of the system, are additional factors that may be considered when selecting parameters for the 3D structure. For instance, the structure 102 can be solid, hollow, and/or may include various structural elements, such as support bars connected together to form the overall shape of the structure 102. The support bars may be various shapes and sizes and can connect together to form the structure 102 via connection elements (e.g., fasteners, joints).

The system 100 further includes antenna arrays 104A-104C configured to perform signal transmission and/or reception operations described herein. An antenna array, also referred to as a phased array, is a set of two or more antennas (i.e., antenna elements). As shown in FIG. 1, the antenna array 104A includes antenna elements 106A, the antenna array 104B includes antenna elements 106B, and the antenna array 104C includes antenna elements 106C. The antenna arrays 104A-104C are shown for illustration purposes, and the system 100 may include a different quantity of antenna arrays in other embodiments. For example, the system 100 may include dozens of antenna arrays coupled at various positions on the structure 102.

Each antenna array may operate using its antenna elements (or a subset of its antenna elements) to transmit or receive signals based on instructions from a computing system, such as a processor 110, a microprocessor, etc. An antenna array can generally include a set of N spatially separated antenna elements with the number of antenna elements being as small as two or as a large as several thousand. The performance of an antenna array may increase with the number of antenna elements in the array. Increasing the number of antenna elements on an antenna array, however, might increase the cost, size, and complexity of the antenna array. In some embodiments, the quantity, size, and arrangement of antenna elements on each antenna array may depend on the desired operations for the antenna array. For example, the cost and complexity of manufacturing as well as the desired operations may be considered when developing and producing the antenna arrays 104A-104C for the system 100. In some embodiments, a first antenna element may face a particular direction and the antenna array may be comprised of other antenna elements pointing in different directions than the first antenna element. In one embodiment, the quantity and the arrangement of antenna elements on each antenna array may be uniform. This way, the antenna arrays may be quickly constructed and easily replaced if needed. In another embodiment, the quantity and the arrangement of antenna elements may differ among antenna arrays.

Other parameters of the antenna arrays 104A-104C may also vary within examples. For instance, the quantity of antenna arrays, materials used for each antenna array, and the orientation and positioning are some parameters that can vary within examples. In some embodiments, the size and shape of each antenna array 104A-104C depends on the shape and arrangement of the structure 102.

In some embodiments, one or more antenna arrays 104A-104C of the system 100 may have a conformal configuration for various applications, including ground-based, air-based, satellite-based, missile-based, and under-water platforms (e.g., Sonar audio waves). Conformal antennas are a form of phased array antenna that can be composed of an array of many identical small flat antenna elements, such as dipole, horn, or patch antennas covering the surface. At each antenna element, the current from the transmitter and/or receiver passes through a phase shifter or time delay device which is controlled by a computing system, such as a microprocessor or a processor. By controlling the phase of the feed current, the directional or non-directional radio waves emitted by the individual antenna elements can be made to combine in front of the antenna by the process of interference forming a strong beam (or beams) of radio waves pointed in any desired direction. When receiving signals, the weak individual radio signals received by each antenna element are combined in the correct phase to enhance signals coming from a particular direction, so the antenna can be made sensitive to the signal from a particular station and reject interfering signals from other directions.

In a conventional phased array, the individual antenna elements can be mounted on a flat surface. In a conformal phased array antenna, the antenna elements can be mounted on a curved surface, and the phase shifters or time delays also compensate for the different phase shifts or time delays caused by the varying path lengths of the radio waves due to the location of the individual antenna elements on the curved surface. Conformal arrays, for example, may be used at frequencies in the microwave or millimeter range due to the small wavelengths.

The system 100 may use the antenna arrays 104A-104C individually or in combination to transmit and receive signals relative to the structure 102. For example, the antenna elements of antenna arrays aligned in parallel on the structure 102 may be used for signal reinforcement or cancellation when transmitting or receiving signals to or from a particular direction. In another embodiment, antenna arrays positioned on opposite sides of the structure 102 may be used for reinforcement or cancellation when transmitting or receiving signals. In another embodiment, antenna elements positioned in other locations on the structure 102 may be used for reinforcement or cancellation when transmitting or receiving signals.

The system 100 further includes operating components 108, which may enable the transmission and/or reception of signals via the antenna arrays 104A-104-C positioned on the structure 102. The operating components may include, but are not limited to, one or more waveform generators, transmitters, receivers, analog-to-digital converters, digital-to-analog converters, signal processors, computing systems (e.g., processor 110), or a display interface. The quantities and arrangement of additional components may differ within example systems.

As shown, the operating components 108 may include a processor 110. The processor may represent one or more general-purpose processors (e.g., a microprocessor) and/or one or more special-purpose processors (e.g., a digital signal processor (DSP), parallel processors, graphics processing units (GPUs), neuromorphic processors, or quantum processors). As such, the processor 110 may include a combination of processors. The processor 110 may perform operations described herein, including operations related to causing the transmission and reception of signals by the antenna arrays 104A-10C.

As shown, the operating components 108 may connect to the subsystem 114. The subsystem 114 may represent a computing system, a server, or other components. As shown in FIG. 1, the subsystem 114 includes a data storage unit 116, a communication interface 118, and a user interface 120. In one embodiment, the subsystem 114 is coupled to the structure 102 of the system 100. For instance, the subsystem 114 may be included within the housing that includes operating components 108. In another embodiment, the processor 110 is positioned remotely from the structure 102 and at the subsystem 114.

The data storage unit 116 may include one or more volatile, non-volatile, removable, and/or non-removable storage components, such as magnetic, optical, or flash storage, and/or can be integrated in whole or in part with one or more processors (e.g., the processor 110). As such, the data storage unit 116 may take the form of a non-transitory computer-readable storage medium, having stored thereon program instructions (e.g., compiled or non-compiled program logic and/or machine code) that, when executed by the processor, cause the processor to perform one or more acts and/or functions, such as those described in this disclosure. Such program instructions can define and/or be part of a discrete software application. In some instances, the processor (e.g., the processor 110) can execute program instructions in response to receiving an input, such as from the communication interface 118 or the user interface 120. In some instances, the data storage unit 116 may be remote from subsystem 114. The data storage unit 116 may also store other types of data, such as those types described in this disclosure.

In some examples, the data storage unit 116 may serve as a local storage for information obtained from one or more external sources. For example, the data storage unit 116 may store information obtained from the antenna arrays 104A-104C and processed by the processor 110.

The communication interface 118 can allow the system 100 to connect to and/or communicate with another entity according to one or more protocols. In an example, the communication interface 118 can be a wired interface, such as an Ethernet interface or a high-definition serial-digital-interface (HD-SDI). In another example, the communication interface 118 can be a wireless interface, such as a cellular or Wi-Fi interface. A connection can be a direct connection or an indirect connection, the latter being a connection that passes through and/or traverses one or more entities, such as such as a router, switcher, or other network device. Likewise, a transmission can be a direct transmission or an indirect transmission. The communication interface 118 may also utilize other types of wireless communication to enable communicating with one or more aircrafts, satellites, mobile units, or ground systems. In some examples, the communication interface 118 may enable communication between the system 100 and components within the system 100.

The user interface 120 can facilitate interaction between the system 100 and an administrator or user, if applicable. As such, the user interface 120 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 120 can include hardware and/or software components that facilitate interaction between one or more users and the system 100. The communication interface 118 and the user interface 120 may further enable control instructions to be provided to the system 100. For example, a user may cause signal transmission or reception in a particular direction via using the user interface 120.

The connection links 112, 122 may correspond to a wired or wireless link to components of the system 100. Various types of connections may be used within embodiments.

Figure 2:
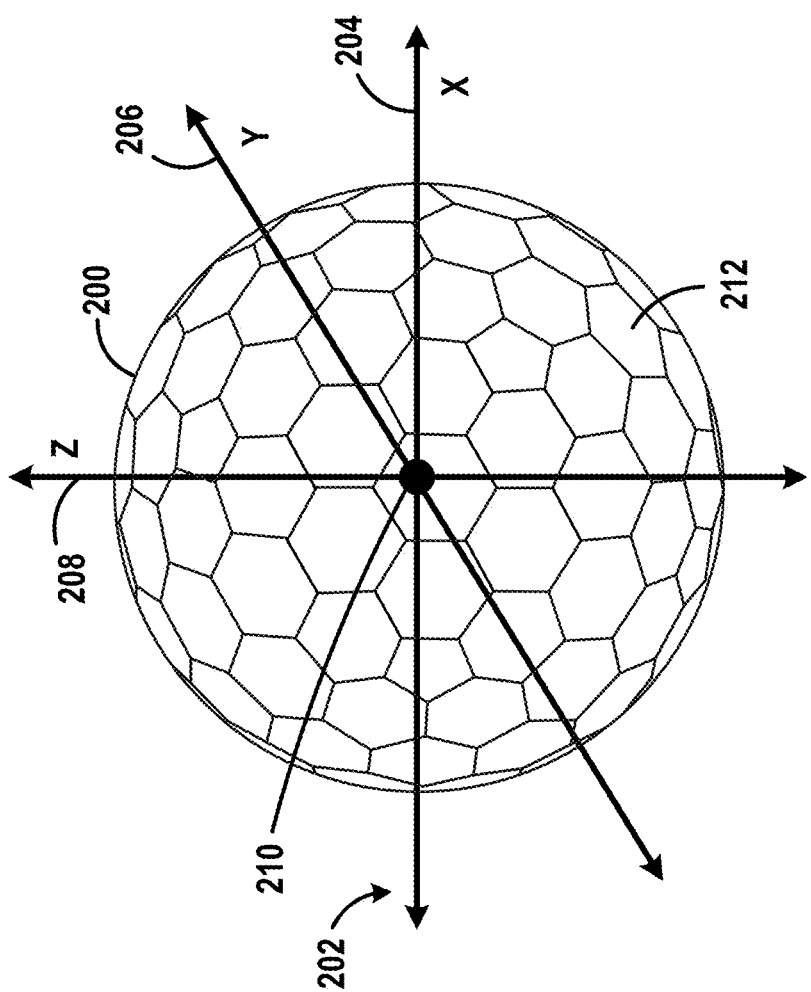
FIG. 2 illustrates a 3D structure positioned relative to a reference coordinate system, according to one or more example embodiments, according to one or more example embodiments.

FIG. 2 illustrates a 3D structure positioned relative to a reference coordinate system, according to one or more example embodiments. In particular, the geodesic dome 200 represents an example 3D structure that may serve as a base for a system or device enabling one or more antenna arrays to be strategically positioned for operation in desired directions (e.g., all directions relative to the geodesic dome 200). For example, the geodesic dome 200 may be implemented as the structure 102 for the system 100 shown in FIG. 1.

In addition, FIG. 2 also shows the geodesic dome 200 positioned relative to a reference coordinate system 202, which is a Cartesian coordinate system with an X-axis 204, a Y-axis 206, and a Z-axis 208 extending away from the origin 210 of the reference coordinate system 202. The reference coordinate system 202 is shown in FIG. 2 to illustrate different directions of operation for antenna arrays (not shown) coupled to the geodesic dome 200. In particular, the geodesic dome 200 is positioned proximate the origin 210 of the reference coordinate system 202. During operation of a 3D phased array system that incorporates the geodesic dome 200, the phased antenna arrays may transmit signals and/or receive signals in any desired direction relative to the X-axis, 204, the Y-axis 206, and the Z-axis 208 of the reference coordinate system 202.

In the embodiment shown in FIG. 2, the geodesic dome 200 has the form of a spherical structure that is based on a geodesic polyhedron. In particular, the exterior of the geodesic dome 200 is represented by an arrangement of hexagons 212 with each side of a given hexagon aligned next to another hexagon. Thus, in the embodiment shown in FIG. 2, each hexagon 212 is shown aligned with sides coupled to six neighboring hexagons. In another embodiment, the exterior of the geodesic dome 200 may be configured with other shapes, such as triangles with each triangle aligned and coupled to three neighboring triangles. Additionally, these exterior components (e.g., hexagon 212) may be made up of various components, such as support bars or other structural elements. In some cases, the hexagons 212 may include antenna arrays configured to perform signal operations, such as the transmission and reception of signals in particular directions.

The geodesic dome 200 may further include other components not shown in FIG. 2 when implemented as part of a 3D antenna system or device. In addition, the geodesic dome 200 may be coupled to other structures, vehicles, aircraft, satellites, stationary support structures, etc., when part of a system.

Figure 3A:
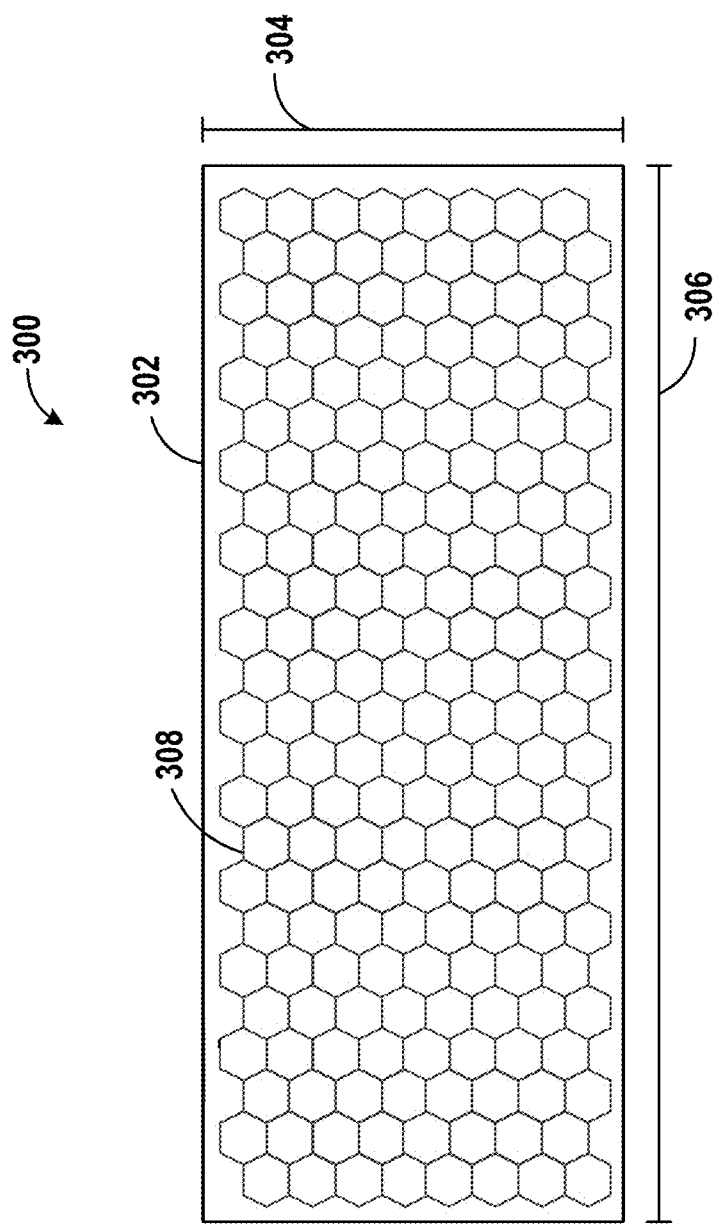
FIG. 3A illustrates an antenna array, according to one or more example embodiments.

FIG. 3A illustrates an antenna array, according to one or more example embodiments. The antenna array 300 includes antenna elements 308 positioned in a honeycomb arrangement on a two-dimensional (2D) rectangular structure 302 to represent one example configuration for an antenna array. For instance, the antenna array 300 may be implemented as the antenna arrays 104A-104C of the system 100 shown in FIG. 1.

In the embodiment shown in FIG. 3A, the rectangular structure 302 serving as the base for the antenna array 300 has a width 304 and a length 306. The quantity and arrangement of the antenna elements 308 may be based on the size of the rectangular structure 302 to fully utilize the available surface area. In other embodiments, parameters (e.g., size, shape) of the antenna array 300 can differ. In other embodiments, some antenna elements 308 may not be disposed or operated on rectangular structure 302 for various reasons such as weight, power, and efficiency. Some of the antenna elements may not be used or operated on rectangular structure 302 so that the honeycomb pattern may not be used or may not be complete.

The antenna array 300 may be a phased array where the antenna elements 308 create a beam of radio waves that can be electronically steered by the system to point in different directions without moving the antenna elements 308. The radio frequency current from a transmitter is fed to each antenna element 308 (or a subset of the antenna elements) with a particular phase relationship or time delay so that the radio waves from the separate antenna elements add together to increase the radiation in a desired direction while also canceling to suppress radiation in undesired directions. In a phased array, the power from the transmitter is fed to the antenna elements through devices called phase shifters or time delays, controlled by a computer system, which can alter the phase electronically, thus steering the beam of radio waves to a different direction. The array may consist of many small antenna elements (e.g., dozens, hundreds, thousands) to achieve high gain. Phased arrays may use different sized antenna elements 308 to achieve optimal efficiency at various radio frequency wavelengths such as UHF, microwaves, or millimeter waves.

The antenna array 300 can be used for transmitting and/or receiving low frequency signal communications (e.g., one or more di-poles) and/or high frequency (e.g., microwave, millimeter, or higher) signal communications. The system may use the antenna array 300 to beam signal communications in any 3D direction with equal or unequal amplitude to form a time-shifted or phase-shifted signal in any direction.

In the embodiment shown in FIG. 3A, the antenna elements 308 are shown having a hexagonal shape. The hexagonal shape may enable antenna elements to be aligned and placed closely together to form the honeycomb arrangement and maximize the use of the surface space of the antenna array 300. In other embodiments, the antenna elements may have other configurations, such as circular, triangular, or other shapes. In addition, the antenna elements may also be arranged on the antenna array 300 in another configuration, such as in a linear array configuration. In various embodiments, the wavelength associated with the antenna elements may be varied by changing the dimensions, shape, or configuration of the particular antenna elements. In some instances, the selection of which antenna elements to use for a particular transmission or reception during operation can be based on respective positions of antenna elements.

Figure 3C:
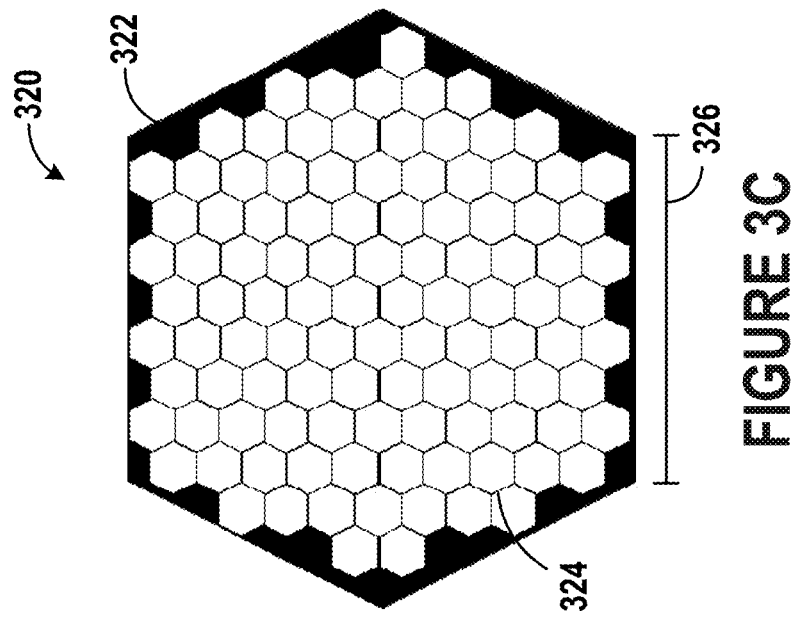
FIG. 3C illustrates an additional antenna array, according to one or more example embodiments.
Figure 3B:
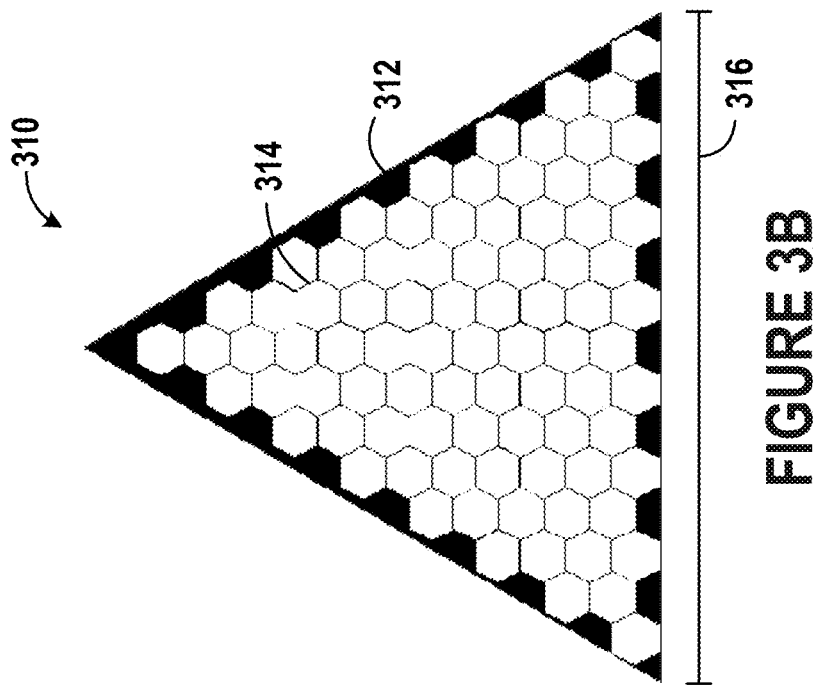
FIG. 3B illustrates another antenna array, according to one or more example embodiments.

FIG. 3B illustrates another antenna array, according to one or more example embodiments. The antenna array 310 is shown having a 2D triangular structure 312 and represents another possible configuration for an antenna array that can used within systems and devices described herein. Similar to the antenna array 300 shown in FIG. 3A, the antenna array 310 includes hexagonal antenna elements 314 arranged in a honeycomb configuration.

In the embodiment shown in FIG. 3B, the three sides of the triangular structure 312 are equal at length 316. The equal length sides may enable easier alignment across a 3D structure within a system, such as the geodesic dome 200 shown in FIG. 2. In other embodiments, however, the lengths of the triangular structure 312 may differ.

FIG. 3C illustrates an additional antenna array, according to example embodiments. Similar to the antenna arrays 300, 310, the antenna array 320 represents another possible configuration for an antenna array that can be used with example 3D systems and devices. As shown, the antenna array 320 includes a hexagon structure 322 with 6 sides of length 326. The antenna array 320 further includes antenna elements 324 positioned in a honeycomb structure across the hexagon structure 322.

Other antenna elements and antenna array configurations are possible. For example, the configuration (e.g., the shape and size) of an antenna array configuration may depend on the configuration of the 3D structure of the antenna system. In addition, a system may include multiple types of antenna arrays. For instance, a system may include a combination of the antenna arrays 300, 310, 320 shown in FIGS. 3A, 3B, 3C.

Figure 4:
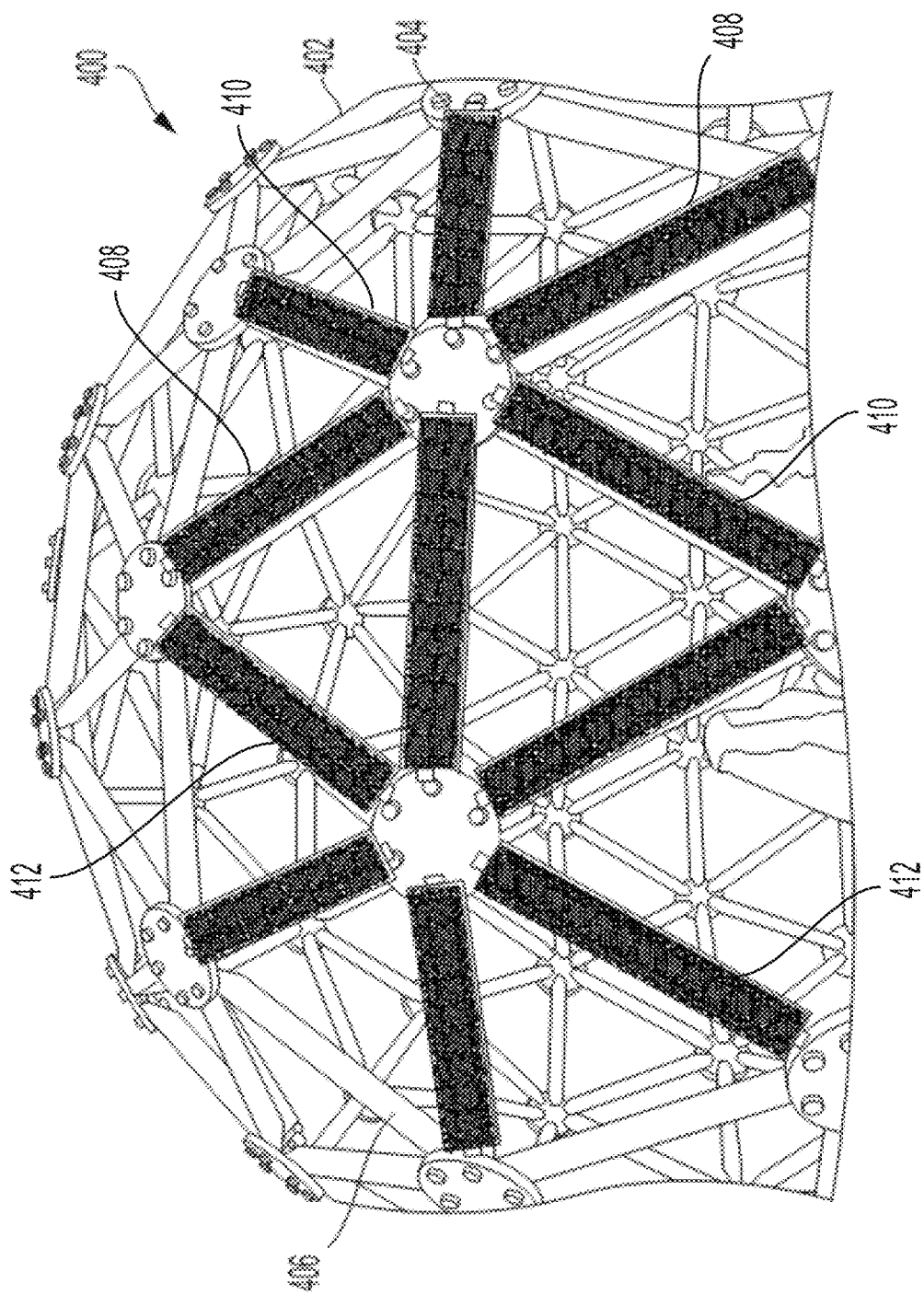
FIG. 4 illustrates a system with antenna arrays coupled to a geodesic dome, according to one or more example embodiments.

FIG. 4 illustrates a system with antenna arrays coupled to a geodesic dome, according to one or more example embodiments. The system 400 represents a 3D system capable of signal operation in any direction desired. As such, the system 400 is shown with antenna arrays 404 coupled to some of the structural bars 406 of a partially shown geodesic dome 402. These components of the system 400 are shown for illustration purposes and may further include other modifications within actual implementation. For instance, the geodesic dome 402 may be a full sphere when actually implemented and more antenna arrays 404 may be coupled to other portions of the geodesic dome 402.

During operation, the system 400 may use antenna elements of the antenna arrays 404 to transmit and/or receive signals in one or more directions. For example, a computing system may be configured to use sets of antenna elements from one or more antenna arrays 404 to transmit or receive signals. The transmission and reception of signals can occur simultaneously in multiple directions.

In some instances, the system 400 may use sets of antenna elements based on the positioning of the antenna elements on the geodesic dome 402. For example, the system 400 may use certain antenna elements for phase reinforcement or cancellation during operation. In particular, the system 400 can use antenna elements of antenna arrays positioned on opposite sides of the geodesic dome 402 to reinforce signals transmitted or received in a particular direction.

In addition, the system 400 may also use combinations of antenna arrays in other ways to increase the effectiveness of operations. For instance, the system 400 may use the antenna arrays 408 together as multiple dipoles for lower frequency signal transmission and reception. In a similar manner, the system 400 may also use the set of antenna arrays 410 to operate as other dipoles. The system 400 may also use antenna arrays arranged in parallel arrangements on the geodesic dome 402 to reinforce phase during transmission. For example, the system 400 may use the set of antenna arrays 412 to phase reinforce or cancel signals for directionality with respect to the set of antenna arrays 410 because of the parallel alignment between these sets. As shown, the system 400 may be configured to utilize the spacing of antenna arrays (and corresponding antenna elements) to enhance signal transmission and reception in desired directions.

Figure 5A:
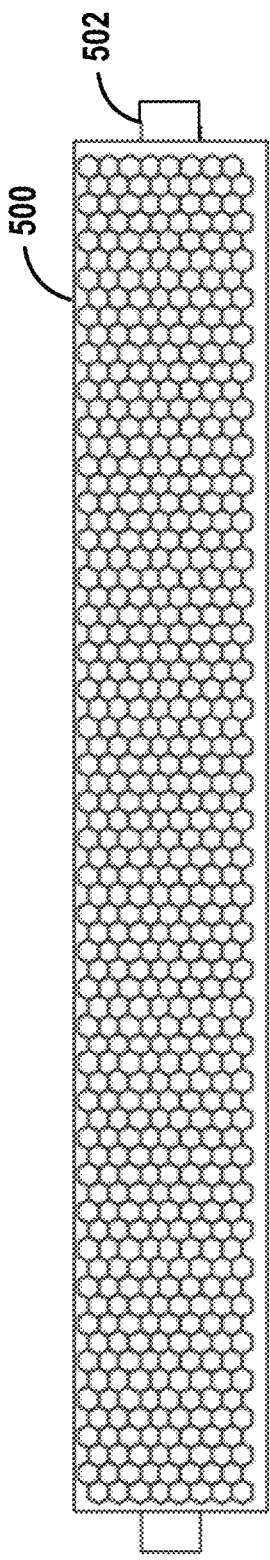
FIG. 5A illustrates an antenna array coupled to a support bar, according to one or more example embodiments.

FIG. 5A illustrates an antenna array coupled to a support bar, according to one or more example embodiments. The antenna array 500 is shown as a 2D rectangular structure coupled in a horizontal alignment to a cylindrical support bar 502. In other embodiments, the support bar 502 can have other structures, such as a rectangular or triangular structure.

Figure 5B:
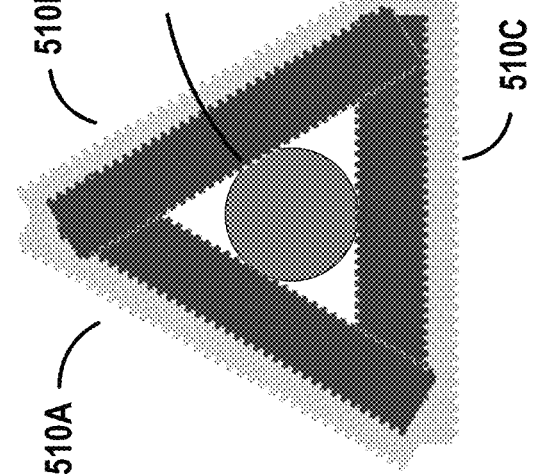
FIG. 5B illustrates a side view of the antenna array coupled to the support bar, according to one or more embodiments.

In addition, the coupling between the antenna array 500 and the support bar 502 may involve one or more fastening elements not shown, such as screws, glue, bonding, mechanical structures, or magnetic-based coupling elements. In addition, FIG. 5B shows a side view of the antenna array 500 coupled to the support bar 502.

In some embodiments, a system may mechanically rotate the support bar 502 to modify an orientation of the antenna array 500. Similarly, the system may also use electronic steering to cause radiating beams to direct signals in a particular direction from the antenna array 500.

Figure 5C:
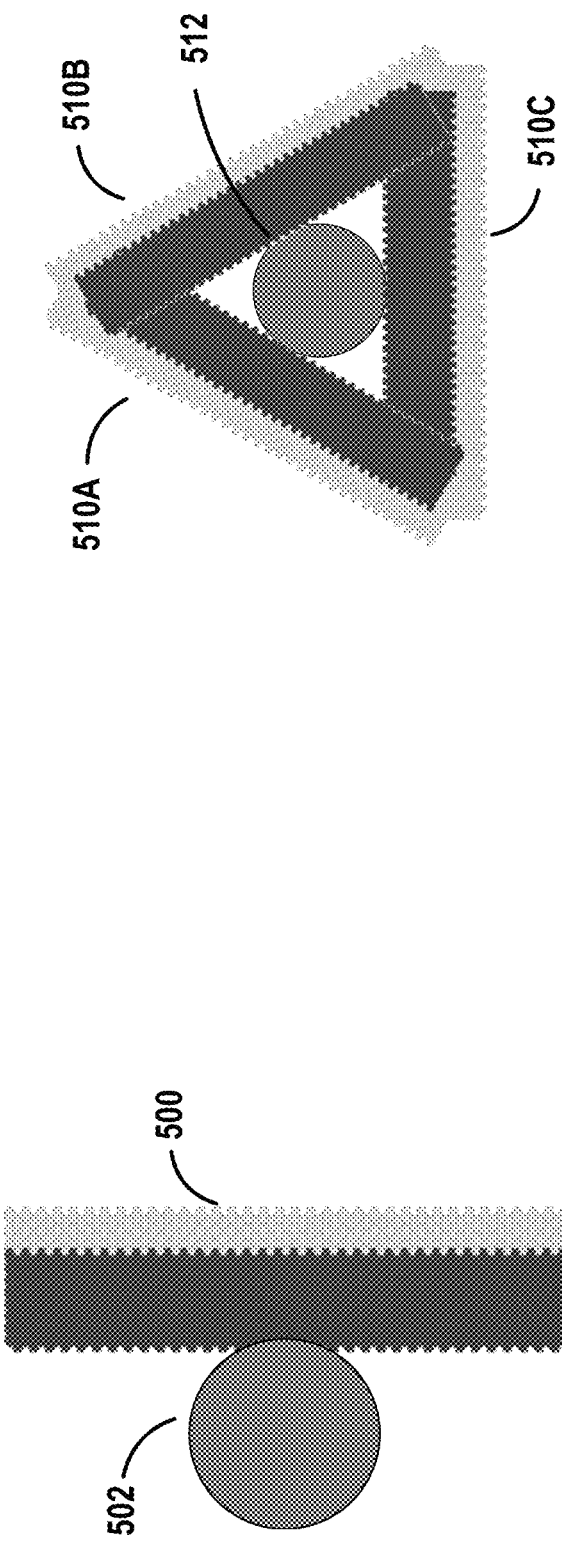
FIG. 5C illustrates a set of antenna arrays coupled to a support bar, according to one or more embodiments.

FIG. 5C illustrates a set of antenna arrays coupled to a support bar, according to one or more embodiments. As shown, antenna arrays 510A, 510B, 510C are coupled to a support bar 512. In such a configuration, a system may use antenna elements of the antenna arrays 510A-510C to communicate signals in multiple directions simultaneously. For example, the system may use electronic steering to enable operation of antenna elements of the antenna arrays 510A, 510B, and 510C in directions across a full 360 degrees around the support bar 512. In particular, electronic steering for each antenna array 510A-510C may enable 120 degrees of operation, which accumulates to the full 360 degrees around the support bar 512. In some embodiments, a processor may cause the support bar 512 to mechanically rotate to modify an orientation of the antenna arrays 510A-510C relative to the support bar 512.

Figure 5D:
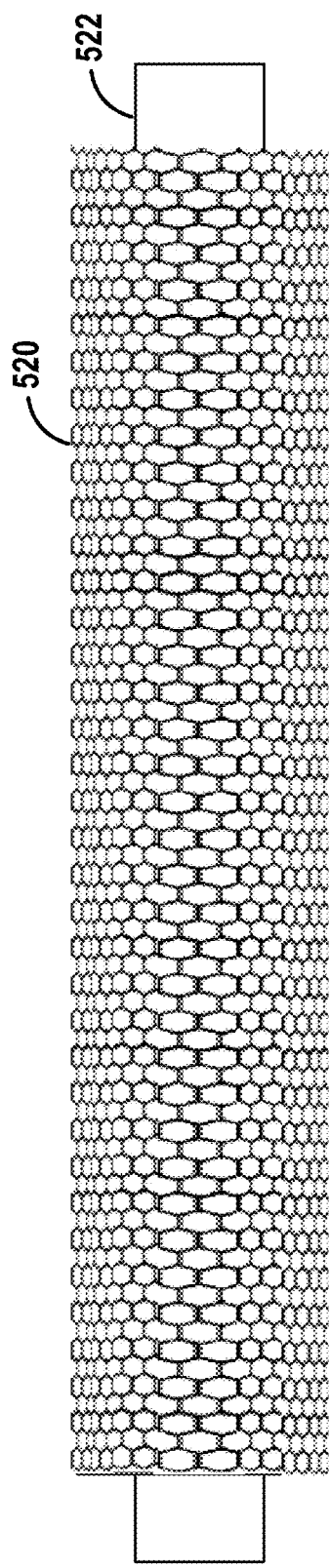
FIG. 5D illustrates an antenna array extending around a support bar, according to one or more embodiments.

FIG. 5D illustrates an antenna array extending around a support bar, according to example embodiments. The antenna array 520 shown in FIG. 5D extends cylindrically around a support bar 522. With such a configuration, antenna elements of the antenna array 520 may transmit and/or receive communication (e.g., radio signals, radar) in multiple directions extending from the support bar 522 simultaneously. For example, a system may cause antenna elements to transmit and/or receive in one or more directions using electronic steering, mechanical steering, or a combination of both. Other ways of coupling antenna arrays to a support bar are possible.

Figure 6:
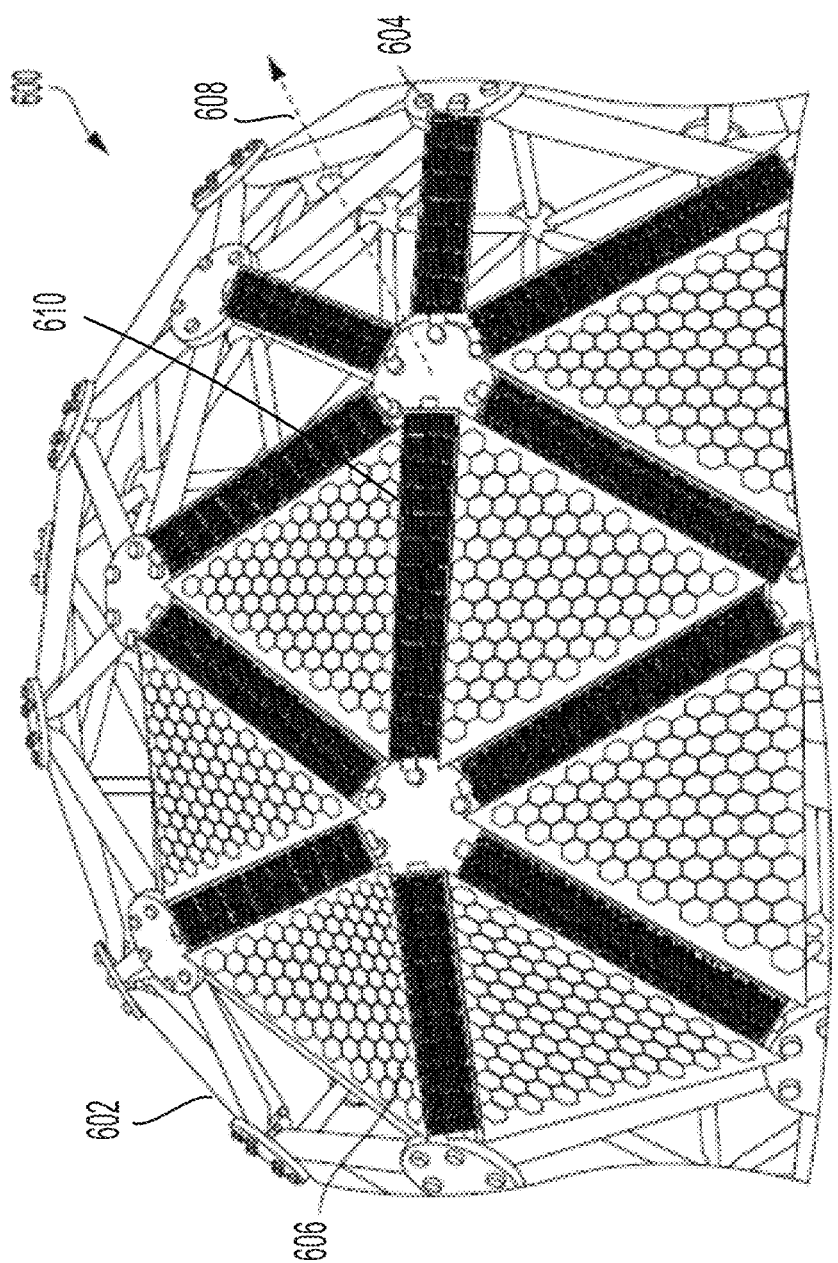
FIG. 6 illustrates another system with antenna arrays coupled to a geodesic dome, according to example embodiments.

FIG. 6 illustrates another system with antenna arrays coupled to a geodesic dome, according to example embodiments. The system 600 includes a first set of antenna arrays 604 and a second set of antenna arrays 606 coupled to support bars of a geodesic dome 602. In other embodiments, the system 600 may include more or fewer components in other arrangements. Similar to the system 400 shown in FIG. 4, the system 600 may use antenna elements of antenna arrays 604, 606 to communicate signals in all directions relative to the geodesic dome 602.

In some embodiments, the system 600 may use the first set of antenna arrays 604 and a third set of antenna arrays 610 in different ways. For example, the system 600 may use the first set of antenna arrays 604 and the third set of antenna arrays 610 to transmit signals at different ranges, beamwidths, pulses, etc. To further illustrate, the system 600 may use a combination of antenna elements from one or both of the first set of antenna arrays 604 and third set of antenna arrays 610 to transmit a beam in the particular direction 608.

Figure 7:
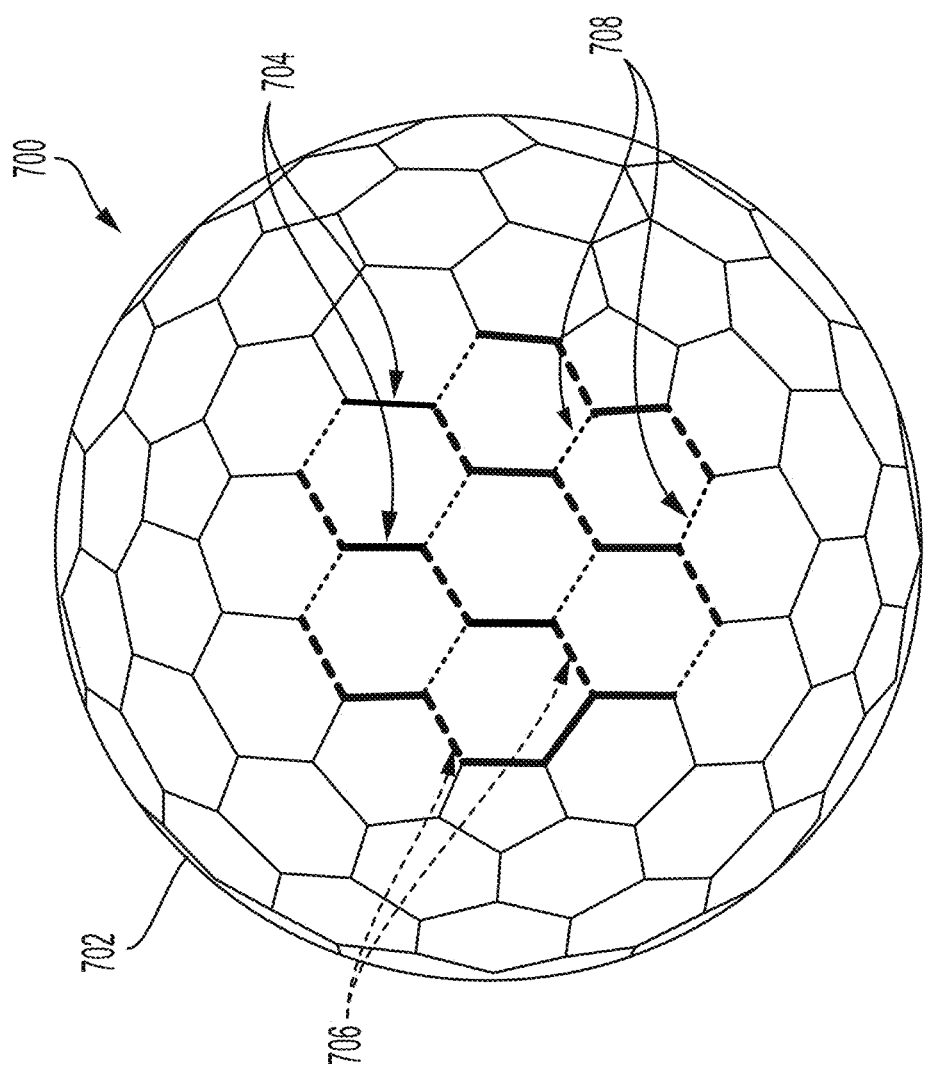
FIG. 7 illustrates operation of a system, according to one or more example embodiments.

FIG. 7 illustrates operation of a system, according to an example embodiment. The system 700 is shown as a hexagon-sided geodesic dome antenna system that includes antenna arrays coupled to the exterior of the geodesic dome 702. In the embodiment shown in FIG. 7, the antenna arrays may be positioned strategically based on the hexagons making up the exterior of the geodesic dome 702. For instance, the geodesic dome 702 may be made up of support bars and antenna arrays may be coupled to the support bars similar to the system shown in FIG. 4.

During operation, the system 700 may use antenna elements to transmit signals (e.g., beams) in one or more particular directions. For instance, the system 700 may use one or more antenna elements from antenna arrays arranged in a parallel alignment on the exterior of the geodesic dome 702 to support phased array operation. To illustrate, FIG. 7 includes antenna array set 704 (i.e., two of the six sides of a particular hexagon, as represented by the bold lines) arranged in a vertical and parallel alignment relative to the geodesic dome 702. Antenna elements from the antenna array set 704 may be collectively used to transmit signals (e.g., a steered beam in a particular direction) and reinforce the signals. The system may also use antenna elements from the antenna array set 706 (i.e., two of the six sides of a particular hexagon, as represented by the thick dashed lines) similarly to transmit signals with increased gain. In addition, the system may also use antenna elements from the antenna array set 708 (i.e., two of the six sides of a particular hexagon, as represented by the thick dashed lines) similarly to transmit signals with increased gain. The system 700 may use phase-shifting or time-delay when transmitting signals to increase the gain and to reinforce the signals.

In some examples, the antenna array set 704 may be used to transmit and receive signals relative to one direction while the antenna array set 706 transmits and receives signals and the antenna array set 708 transmits and receives signals relative to other directions. The antenna array sets may be used in other ways, such as phase reinforcement or cancellation. In addition, different antenna elements within the antenna arrays sets 704-708 may be used in various combinations for beam steering and forming.

Figure 8:
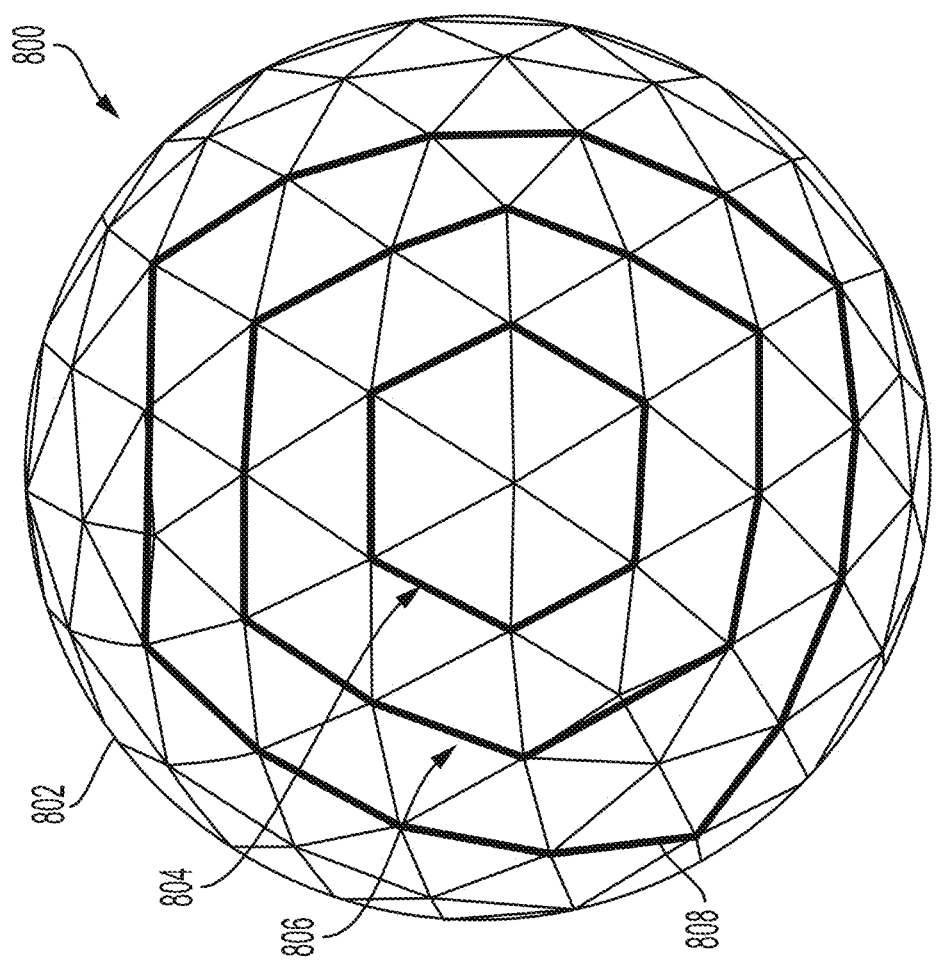
FIG. 8 illustrates operation of a system, according to one or more example embodiments.

FIG. 8 illustrates operation of a system, according to one or more example embodiments. The system 800 represents a triangle-sided geodesic dome antenna system that includes a geodesic dome 802 configured with antenna arrays (not shown). In particular, the antenna arrays maybe positioned on support structures or other portions of the geodesic dome 802. For example, one or more antenna arrays may have a rectangular shape similar to FIG. 3A and couple to the geodesic dome 802 along the sides of the triangles making up the dome's exterior. In some embodiments, one or more antenna arrays may have a triangular structure similar to FIG. 3B and make up the triangles shown as the exterior of the geodesic dome 802. In one instance, these antenna arrays may be conformal.

The system 800 may use antenna elements of the antenna arrays to transmit and receive signals from all directions. In some instances, the system 800 may transmit one or more than one signal at a given time in one or more directions and may also receive more than one signal during the same period of time. Transmission may involve electronic steering beams to particular directions using the antenna elements in particular ways. For instance, the system 800 may select and use antenna elements based on the position of these elements on the geodesic dome.

In some embodiments, the system 800 may use antenna elements positioned in particular configurations, such as hexagonal arrangements along the exterior of the geodesic dome 802. For example, the system 800 may use antenna elements of antenna arrays positioned in an arrangement that forms the interior hexagon 804 shown in FIG. 8. In particular, the system 800 may use these antenna elements to emit a direct plane wave or directional beam extending from the geodesic dome 802 into the environment. The system 800 may also use antenna elements from the antenna arrays that form the middle hexagon 806 to further reinforce the direct plane wave or directional beam transmitted by the antenna elements from the interior hexagon 804. For instance, the system 800 may use phase-shifting or time-delay to reinforce the signals. The system 800 may further use antenna elements of the antenna arrays that make up the exterior circular or hexagonal shape 808 shown in FIG. 8 to reinforce the direct plane wave or directional beams transmitted by antenna elements from the middle hexagon 806 and/or the interior hexagon 804. In other embodiments, antenna elements from other portions of the system 800 may be used to reinforce signals transmitted by other antenna elements of the system 800.

Figure 9:
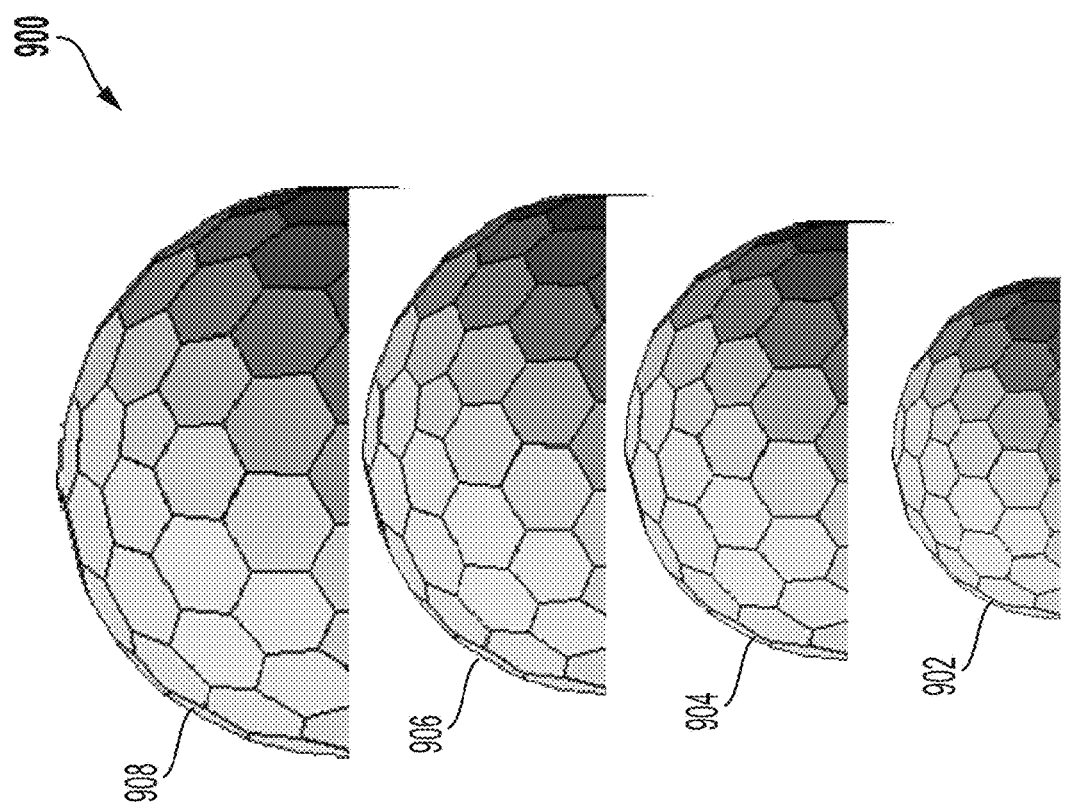
FIG. 9 illustrates a multiple dome system, according to one or more embodiments.

FIG. 9 illustrates a multiple dome system, according to one or more embodiments. The system 900 includes multiple semi-sphere domes 902, 904, 906, 908 with each shown as a semi-sphere. In other embodiments, the system 900 may include full sphere similar to the geodesic dome 200 shown in FIG. 2. The inner antennas of inside domes can be used to reinforce phase-shift or time-delay of outer antennas. For example, the semi-sphere dome 902 may be used to reinforce phase-shift or time-delays of the semi-sphere dome 904. Similarly, the combination of the semi-sphere domes 902, 904, 906, may be used to reinforce phase shift or time-delay transmissions (or receptions) performed by antenna arrays coupled to the exterior of semi-sphere dome 908.

Figure 10:
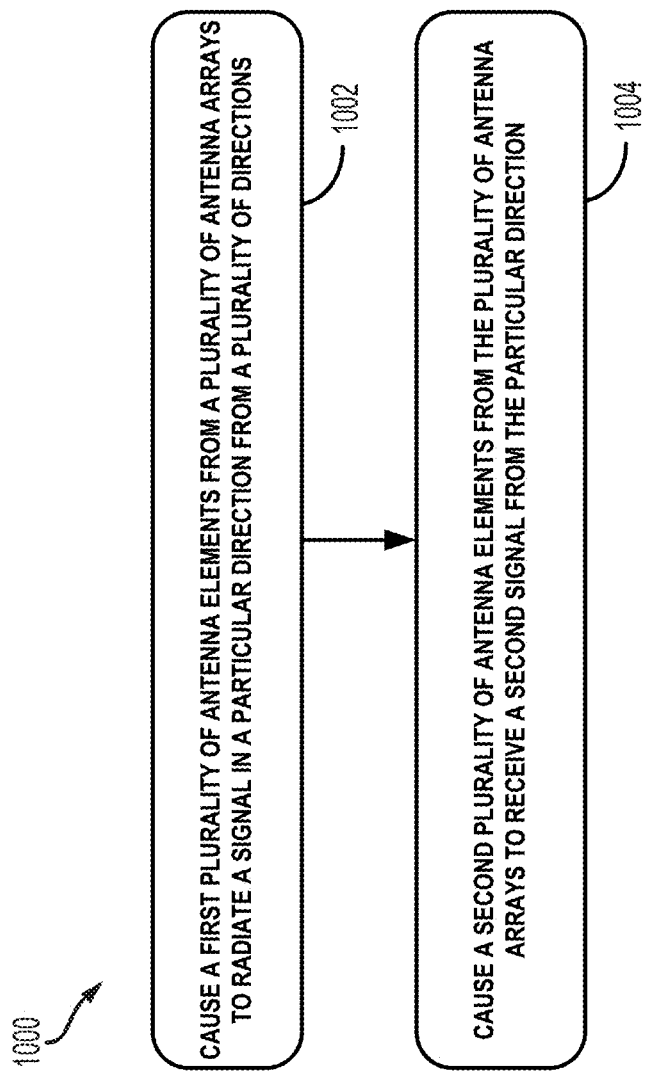
FIG. 10 shows a flowchart of a method, according to one or more embodiments.

FIG. 10 shows a flowchart of a method, according to an example implementation. The method 1000 presents an example method that could be used with any of the devices or systems presented herein, including the devices and systems illustrated in the Figures. In other examples, components of the devices and/or systems may be arranged to be adapted to, capable of, or suited for performing the functions, when operated in a specific manner.

The method 1000 can include one or more operations, functions, or actions as illustrated by one or more of blocks 1002 and 1004. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 1002, the method 1000 involves causing, by a processor, a first plurality of antenna elements from a plurality of antenna arrays to radiate a signal in a particular direction from a plurality of 3D directions. The plurality of antenna arrays is coupled to or disposed on a 3D structure. In some instances, each antenna element of the antenna elements is a hexagonal-shaped antenna element and each antenna array includes a plurality of hexagonal-shaped antenna elements. In some instances the antenna elements may be shaped as triangles or other shapes. In some embodiments, a wavelength associated with the antenna elements of a particular antenna array is based on a shape, size, or dimension of the particular antenna element or the antenna array.

A center of the three-dimensional structure is located at an origin of a reference coordinate system that includes an X-axis, a Y-axis, and a Z-axis extending from the origin of the reference coordinate system. As such, the plurality of antenna arrays may be coupled to the 3D structure such that antenna elements from the plurality of antenna arrays are configured to operate in the plurality of 3D directions relative to the X-axis, the Y-axis, and the Z-axis of the reference coordinate system. The plurality of directions may include all directions extending away from the origin of the reference coordinate system.

In some instances, a set of antenna elements of the antenna arrays is configured to radiate radar signals having a time-shift or phase-shift in one or more directions. Each antenna element within the set of antenna elements is selected based on respective positions of the antenna arrays relative to the 3D structure. For instance, the radar signals may include a first radar signal radiated in a first direction away from the 3D structure and a second radar signal radiated in a second direction away from the 3D structure.

In some examples, causing the first plurality of antenna elements to radiate the signal in the particular 3D direction involves electronically steering a first set of antenna elements to radiate at least one signal in a first direction and a second set of antenna elements to radiate at least one signal in a second direction simultaneously. In some instances, the 3D is a geodesic dome. When the 3D structure is a geodesic dome, electronically steering the first set and second set of antenna elements may involve electronically steering the first set of antenna elements and the second set of antenna elements using phase reinforcement or cancellation based on one or more antenna arrays positioned on an opposite side of the geodesic dome. In addition, the system may also be configured to electronically steer antenna elements of the antenna arrays to further enable the antenna elements to receive radar reflections in the directions relative to the X-axis, the Y-axis, and the Z-axis of the reference coordinate system.

In some embodiments, a processor may be configured to cause a first set of antenna elements from the plurality of antenna arrays to radiate a first set of radar signals in a first direction from the 3D structure, cause a second set of antenna elements from the plurality of antenna arrays to radiate a second set of radar signals in a second direction from the 3D structure, cause a third set of antenna elements from the plurality of antenna arrays to receive a first radar reflection in the first direction, and cause a fourth set of antenna elements from the plurality of antenna arrays to receive a second radar reflection in the second direction. The first radar reflection can correspond to the first set of radar signals, and the second radar reflection can correspond to the second set of radar signals.

In some embodiments, the antenna elements include a di-pole (e.g., a low frequency di-pole). For example, a first antenna array from the plurality of antenna arrays includes a first di-pole, and a second antenna array from the plurality of antenna arrays includes a second di-pole. The first antenna array and the second antenna array are coupled to the 3D structure in a parallel alignment.

In some embodiments, the 3D structure corresponds to a geodesic dome having support bars arranged to form the geodesic dome. The antenna arrays are coupled such that each antenna array is coupled to at least one support bar. As such, the system may further include a second set of antenna arrays where each antenna array is coupled between a set of support bars from the plurality of support bars. Each antenna array of the second set of antenna arrays may include a 2D shape that is based on an arrangement of the support bars. For example, the antenna arrays may be coupled between sets of support bars.

At block 1004, the method 1000 involves causing, by the processor, a second plurality of antenna elements from the plurality of antenna arrays to receive a second signal in the particular direction. The second signal may correspond to a reflection of the first signal radiated in the particular direction.

Figure 11B:
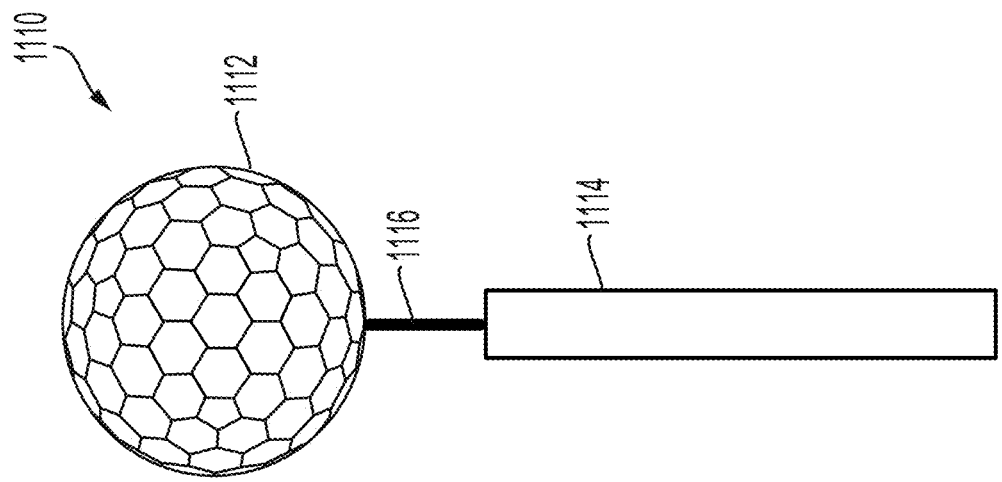
FIG. 11B illustrates another stationary pole system, according to one or more embodiments.
Figure 11A:
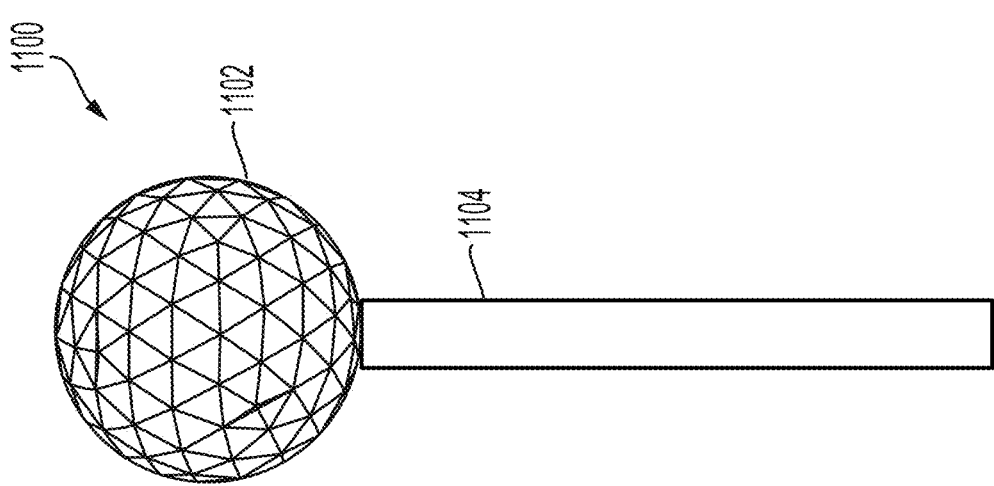
FIG. 11A illustrates a stationary pole system, according to one or more embodiments.

FIG. 11A illustrates a stationary pole system, according to one or more embodiments. The system 1100 includes a 3D phased array antenna 1102 mounted on a utility pole 1104. The utility pole 1104 may be an electrical, telephone, power pole, or any other kind of vertical structure.

FIG. 11B illustrates another stationary pole system, according to one or more embodiments. The system 1100 includes a 3D phased array antenna 1112 coupled to a utility pole 1114 with an additional height bar 1116. The additional height bar 1116 can be used to position the 3D phased array antenna 1112 at various heights.

FIG. 11C illustrates a building system, according to one or more embodiments. The building system 1120 includes a 3D phased array antenna 1122 coupled to a building 1126 via an attachment structure 1124. The attachment structure 1124 can be any type of physical structure capable of attaching the 3D phased array antenna 1122 to the building 1126. Note that the shapes of the example 3D phased array antennas 1102, 1106, and 1114 may not be exactly shaped like a geodesic dome. Any shape and/or structure that can transmit and receive in 3D directions can be used.

Figure 12B:
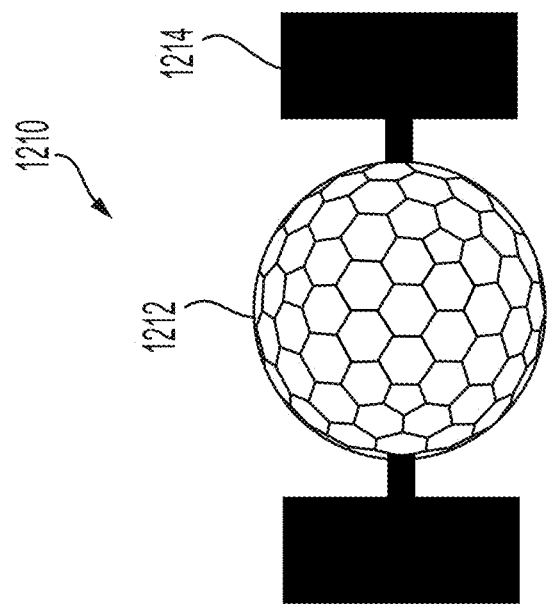
FIG. 12B illustrates another satellite system, according to one or more embodiments.
Figure 12A:
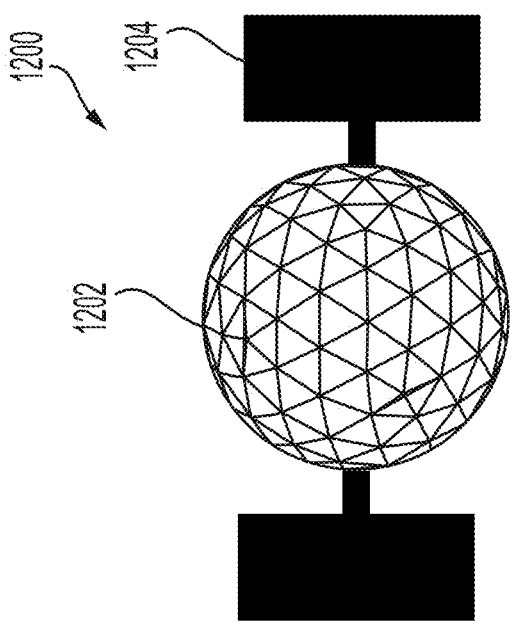
FIG. 12A illustrates a satellite system, according to one or more embodiments.

FIG. 12A illustrates a satellite system, according to one or more embodiments. The satellite system 1200 includes a 3D phased array antenna 1202 with exemplary triangle element faces confirming to a spherical satellite structure configured with solar panels 1204.

FIG. 12B illustrates another satellite system, according to one or more embodiments. The satellite system 1210 includes a 3D phased array antenna 1212 with conformal hexagonal element faces confirming to a spherical satellite structure configured with solar panels 1214. The shapes of the 3D phased array antennas 1202 and 1212 may be shaped the same as or differently from the geodesic dome structure shown. Any shape and/or structure that can transmit and receive in 3D directions can be used.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
    a three-dimensional (3D) structure, wherein a center of the 3D structure is located at an origin of a reference coordinate system, and wherein the reference coordinate system includes an X-axis, a Y-axis, and a Z-axis extending from the origin of the reference coordinate system; and
    a plurality of antenna elements, wherein each antenna element from the plurality of antenna elements is configured to operate via electronic steering as an antenna array from a plurality of antenna arrays, and wherein the plurality of antenna elements is coupled to the 3D structure such that electronically steering antenna elements from the plurality of antenna elements enables antenna arrays from the plurality of antenna arrays to electronically steer electromagnetic signals simultaneously in a plurality of directions relative to the X-axis, the Y-axis, and the Z-axis of the reference coordinate system.

2. The system of claim 1, wherein a set of antenna elements from the plurality of antenna elements is configured to electronically steer a plurality of signals using a time-delay or phase-shift in one or more directions, and wherein the set of antenna elements is selected based on respective positions of antenna elements relative to the 3D structure.

3. The system of claim 2, wherein the plurality of signals comprises:
    a first signal electronically steered in a first direction away from the 3D structure; and
    a second signal electronically steered in a second direction away from the 3D structure.

4. The system of claim 1, wherein said electronically steering antenna elements from the plurality of antenna elements further enables the antenna elements to receive signals in the plurality of directions relative to the X-axis, the Y-axis, and the Z-axis of the reference coordinate system.

5. The system of claim 4, wherein the plurality of directions relative to the X-axis, the Y-axis, and the Z-axis of the reference coordinate system comprises:
    all directions extending from the origin of the reference coordinate system.

6. The system of claim 1, further comprising:
    a processor configured to:
        cause a first set of antenna elements from the plurality of antenna arrays to transmit a first signal in a first direction from the 3D structure;
        cause a second set of antenna elements from the plurality of antenna arrays to transmit a second signal in a second direction from the 3D structure;
        cause a third set of antenna elements from the plurality of antenna arrays to receive a third signal from the first direction, wherein the third signal corresponds to the first signal; and
        cause a fourth set of antenna elements from the plurality of antenna arrays to receive a fourth signal from the second direction, wherein the fourth signal corresponds to the second signal.

7. The system of claim 1, wherein the plurality of antenna arrays include one or more di-poles.

8. The system of claim 7, wherein a first antenna array from the plurality of antenna arrays includes a first di-pole and a second antenna array from the plurality of antenna arrays includes a second di-pole, and wherein the first antenna array and the second antenna array are coupled to the 3D structure in a parallel alignment.

9. The system of claim 1, wherein each antenna element is a hexagonal-shaped antenna element, and wherein one or more antenna arrays from the plurality of antenna arrays includes a plurality of hexagonal-shaped antenna elements arranged in a honeycomb configuration.

10. The system of claim 1, wherein:
the 3D structure corresponds to a geodesic dome having a plurality of support bars arranged to form the geodesic dome; and
the plurality of antenna arrays are coupled such that each antenna array is coupled to at least one support bar.

11. The system of claim 10, further comprising:
a second plurality of antenna arrays, wherein each antenna array from the second plurality of antenna arrays is coupled between a set of support bars from the plurality of support bars.

12. The system of claim 11, wherein each antenna array from the second plurality of antenna arrays comprises a two-dimensional (2D) shape that is based on an arrangement of the plurality of support bars.

13. The system of claim 1, further comprising:
a vehicle, wherein the 3D structure is coupled to the vehicle.

14. A device comprising:
a three-dimensional (3D) structure, wherein a center of the 3D structure is located at an origin of a reference coordinate system, and wherein the reference coordinate system includes an X-axis, a Y-axis, and a Z-axis extending from the origin of the reference coordinate system;
a plurality of antenna arrays, wherein each antenna array includes antenna elements configured to operate via electronic steering, and wherein the plurality of antenna arrays is coupled to the 3D structure such that electronically steering antenna elements of one or more antenna arrays enables simultaneous operation in a plurality of directions relative to the X-axis, the Y-axis, and the Z-axis of the reference coordinate system; and
a processor configured to:
electronically steer a first set of antenna elements to transmit a first signal in a first direction of the plurality of directions; and
electronically steer a second set of antenna elements to transmit a second signal in a second direction of the plurality of directions, wherein the first direction and the second direction are different.

15. The device of claim 14, wherein the processor is configured to electronically steer the first set of antenna elements and the second set of antenna elements simultaneously.

16. The device of claim 15, wherein the processor is further configured to:
electronically steer a third set of antenna elements to receive a third signal from the first direction; and
electronically steer a fourth set of antenna elements to receive a fourth signal from the second direction.

17. The device of claim 14, wherein a wavelength associated with the antenna elements of a particular antenna array is based on a configuration of the antenna elements.

18. A method comprising:
causing, by a processor, a first plurality of antenna elements from a plurality of antenna arrays to radiate a signal in a particular direction from a plurality of directions, wherein the plurality of antenna arrays is coupled to a three-dimensional (3D) structure, wherein a center of the 3D structure is located at an origin of a reference coordinate system that includes an X-axis, a Y-axis, and a Z-axis extending from the origin of the reference coordinate system, and wherein the plurality of antenna arrays is coupled to the 3D structure such that antenna elements from the plurality of antenna arrays are configured to operate in the plurality of directions relative to the X-axis, the Y-axis, and the Z-axis of the reference coordinate system; and
causing, by the processor, a second plurality of antenna elements from the plurality of antenna arrays to receive a second signal from the particular direction.

19. The method of claim 18, wherein said causing the first plurality of antenna elements from the plurality of antenna arrays to radiate the signal in the particular direction comprises:
electronically steering a first set of antenna elements to radiate at least one signal in a first direction and a second set of antenna elements to radiate at least one signal in a second direction simultaneously.

20. The method of claim 19, wherein the 3D structure is a geodesic dome, and wherein said electronically steering the first set of antenna elements and the second set of antenna elements further comprises:
electronically steering the first set of antenna elements and the second set of antenna elements using phase reinforcement or cancellation based on one or more antenna arrays being positioned on an opposite side of the geodesic dome.

* * * * *